United States Patent

Hermansson et al.

[15] 3,684,945
[45] Aug. 15, 1972

[54] REVERSIBLE CONVERTER
[72] Inventors: Bo Hermansson; Curt Hansson, both of Vasteras, Sweden
[73] Assignee: Allmanna Swenska Elektriska Aktiebolaget, Vasteras, Sweden
[22] Filed: Feb. 8, 1971
[21] Appl. No.: 113,657

[30] Foreign Application Priority Data

March 18, 1868 Sweden ...................3529/68

[52] U.S. Cl. ...................321/13, 318/257, 318/293, 321/19, 321/40
[51] Int. Cl. .................................H02m 1/02, H02p
[58] Field of Search.................321/5, 13, 19, 38, 40; 318/257, 258, 293

[56] References Cited

UNITED STATES PATENTS

| | | | |
|---|---|---|---|
| 3,551,782 | 12/1970 | Maynard | 321/13 |
| 3,538,412 | 11/1970 | Graf et al | 321/13 |
| 3,486,102 | 12/1969 | Wilkerson | 321/5 |

Primary Examiner—William H. Beha, Jr.
Attorney—Jennings Bailey, Jr.

[57] ABSTRACT

A reversible converter for feeding a DC load such as a motor from an AC network has a current regulator which is supplied with a signal representing the actual value of the direct current and a desired value. The regulator is connected both to an emitter for delivering control pulses to the rectifier with a control angle which is dependent on the output voltage of the current regulator, and to a device for switching the polarity of the converter depending on the polarity of the desired current value, which causes a retarding of the converter towards inverter operation before shifting of the polarity of the converter, unblocking and advancing towards rectifier operation. A member which senses the voltage over the DC load is connected to the current regulator when the polarity of the inverter is shifted and delivers to it a signal corresponding to a control angle of the control pulses such that the sum of the inner direct voltage of the converter and the voltage over the DC load is slightly less than zero.

5 Claims, 6 Drawing Figures

INVENTOR.
BO HERMANSSON
CURT HANSSON
BY
Jennings Bailey Jr

REVERSIBLE CONVERTER

BACKGROUND OF THE INVENTION

1. Field of the Invention

The present invention relates to a reversible converter feeding a DC load.

2. The Prior Art

Such a converter comprises a current regulator, to the input side of which are connected the instantaneous or the actual value of the direct current of the converter and an emitter for setting a desired DC value in the converter. The current regulator is connected to a control pulse generator for the valves of the converter, which control pulse generator delivers control pulses with a control angle which is dependent on the output voltage of the current regulator. Further, the converter comprises a means for shifting the polarity of the converter in relation to the load, the switching taking place in dependence on the polarity of said desired DC value so that the polarity of the converter corresponds to the polarity of the desired DC value.

Such means for shifting polarity may consist of a proper pole reverser, for example in the form of a contact switch or a valve switcher. Another possibility is to make the converter of two reverse-parallel- connected (cross-connected) converters which are controlled so that one or the other is always blocked so that circulating currents are prevented between the two converters.

The current regulator is normally constructed as a control amplifier which is dependent on the difference between the real value and the desired value of the current and emits an output voltage which determines the control angle of the valves in relation to their commutation voltages. The desired value may, for example, be derived from the desired power of the DC load or, if this is a DC motor, from the desired speed of this motor. An order for increased speed will thus cause an increase in the desired value of the current and said control angle is then reduced so that the direct voltage, and thus the direct current, of the converter increase until the desired speed has been achieved.

An order for decreased motor speed or reversal of the motor causes the desired value of the speed to be less than the actual value, so that the desired value of the current changes sign and the converter is retarded towards inverter operation, that is, the control angle of the valves is increased so that the direct current rapidly drops to zero. The converter can then be blocked and its polarity is shifted, after which the converter is unblocked in a control state corresponding to inverter operation. When the converter is then again advanced towards rectifier operation, that is, the control angle is decreased, its internal direct voltage (still in the inverter area) will decrease until it is less than the armature voltage of the motor so that power is fed back from the motor to the converter and the speed of the motor drops rapidly.

When the motor is to be reversed the converter will be continuously advanced towards rectifier operation as the motor speed drops and when this has become zero the converter transfers to rectifier operation so that the power is fed from the converter to the motor and its speed increases in the desired direction until the desired value is reached.

However, if the speed is only to be reduced to a lower value, passage beyond the lower speed will cause the desired value of the current to shift polarity. The converter will then be retarded towards inverter operation again so that it is again blocked, its polarity shifts again and the converter is unblocked and advances towards rectifier operation until its direct current corresponds to the desired value dictated by the speed regulator.

In both cases the process is controlled completely automatically by the current regulator and the pole shifter and it is obvious that this should happen as rapidly as possible. It is also equally obvious that the actual speed of alteration of the DC current and the motor speed is dictated by the inherent capacity of the various components so that the speed of alteration of said magnitude is maximized in advance.

SUMMARY OF THE INVENTION

All that remains to be shortened, therefore, is the dead time between the various switching steps and the present invention relates to shortening the time from unblocking the converter until the moment when the converter again becomes current-carrying. According to the invention this is done by providing the converter with a member to sense the voltage over the DC load which member is connected to the input side of the current regulator when the converter shifts polarity. This member gives the current regulator an additional signal of a magnitude corresponding to such a control angle for the control pulses that the inner direct voltage of the converter has such a value that the sum of this inner direct voltage and the voltage over the DC load, calculated in the conducting direction of the converter (total voltage) is less than zero by a certain small quantity. The magnitude of this quantity should substantially correspond to the amplitude of the ripple in the direct voltage of the converter, that is, the amplitude of the alternating voltage superimposed on the direct voltage.

The consequence is that the resultant total voltage over the converter immediately after unblocking is negative, so that no current will flow in the moment of unblocking, but this voltage is rather low and, as soon as the converter starts to advance towards rectifier operation, the current starts to flow in the circuit. In practice the control angle is adjusted so that the ripple of the converter voltage causes an extremely low pulsing current to flow through the circuit even during the unblocking although the average value of the total voltage is negative.

In the previously known constructions the converter is unblocked at full inverter operation and the current cannot start to flow until the converter has been advanced so far towards rectifier operation that its voltage has passed the value of the voltage over the load. It is this time, that is, the time taken for advancing from full inverter operation to the point where the converter voltage has been adjusted to the load voltage, which is eliminated according to the invention. During this time the load is, so to say, left to itself because of the interruption in the current and, for example, the motor speed can alter arbitrarily, which gives rise to discontinuity in the control. This discontinuity is eliminated or considerably limited according to the invention.

BRIEF DESCRIPTION OF THE DRAWINGS

The invention will be further described with reference to the accompanying drawings where FIGS. 1a, b, c, d show different stages in the switchover and FIG. 2 shows the corresponding control angles, whereas

DESCRIPTION OF THE PREFERRED EMBODIMENTS

Figure 1A:
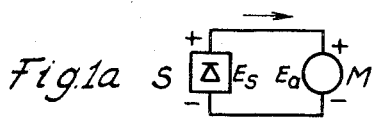
Figure 2:
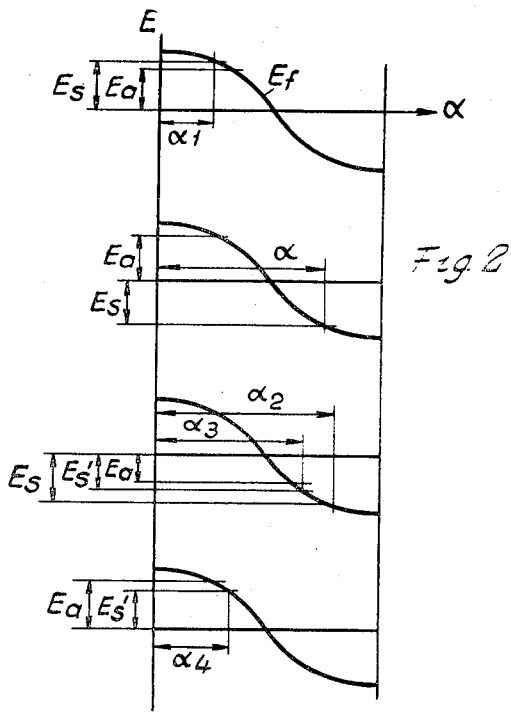

FIGS. 1a and 2a show the stationary operating conditions. The converter S drives the motor M. The current direction is indicated by the arrow in FIG. 1a. The converter is driven with a control angle $\alpha_1$, which is derived by means of a control function voltage $E_f$ from the feeding alternating current network and a control voltage $E_s$ from the current regulator so that the converter voltage obtained is proportional to $E_s$. The armature voltage of the motor, which is opposite to and lower than the converter voltage, is indicated on a corresponding scale in FIG. 2 by $E_a$.

In case b an order has been given to retard or reverse the speed of the motor. First the converter is retarded towards inverter operation corresponding to an increasing control angle $\alpha$. The current in the circuit falls rapidly towards zero after which the converter is blocked and shifts polarity. The converter is then unblocked, see FIG. 1c and 2c, which according to previously known methods, took place at full inverter operation, that is, with a control angle $\alpha_2$. However, according to the invention the armature voltage of the motor is sensed and the current regulator obtains an input magnitude corresponding to a higher voltage $E_s'$ and control angle $\alpha_3$. Only a small reduction of the control angle is then necessary before the converter voltage $E_s'$ passes the motor voltage and the current starts to flow in the direction of the arrow. The converter operates as inverter and power is fed from the motor to the converter so that the speed and thus the motor voltage $E_a$ fall rapidly. If the motor is to be reversed this process continues since the control angle $\alpha$ and thus $E_s$ are reduced in time with the motor voltage $E_a$ and gradually the converter switches over to rectifier operation, the motor reverses and the speed increases in the opposite direction until the desired speed is achieved.

If the speed is only to be reduced, when the lower speed has been reached the converter will again be retarded towards inverter operation so that the current becomes zero again. The converter is blocked and shifts polarity again and when it is again unblocked, case d is arrived at. According to previous methods the converter would even now be unblocked at full inverter operation, that is, control angle $\alpha_2$, after which the converter would be advanced towards rectifier operation until its voltage $E_s$ exceeded the motor voltage $E_a$.

According to the invention, however, the current regulator is again given such an input voltage signal that the converter is unblocked with a control angle $\alpha_4$ corresponding to rectifier operation and a voltage $E_s'$ which is only slightly less than the motor voltage $E_a$. After this only a tiny reduction of the control angle $\alpha$ is required for the converter voltage $E_s$ to exceed the motor voltage $E_a$ so that power is fed from the converter to the motor by current in the direction of the arrow. During a reduction in speed, therefore, two shifts of polarity are required of the converter whereas in reversing only one shift of polarity is required.

Figure 3:
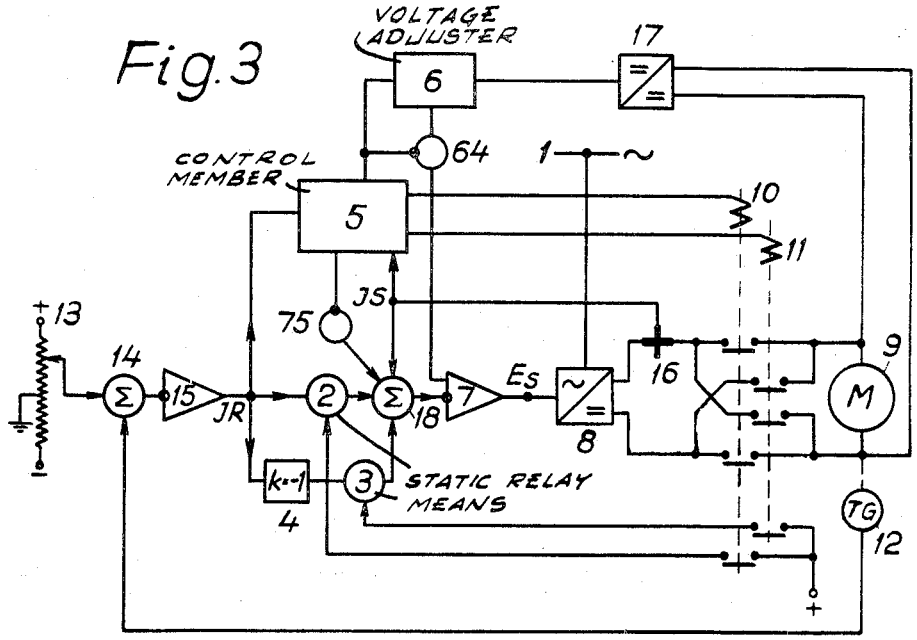
FIGS. 3–5 show connections according to the invention.

FIG. 3 shows a converter connection according to the invention where a converter 8, fed from an alternating current network 1, over the contacts in two pole switches 10, 11, feeds a DC motor 9. This is provided with a tachometer-generator 12, the voltage of which is connected to a summation member 14 which forms the input circuit of a current reference emitter which is an amplifier 15. A desired value emitter for the motor speed is also connected to the member 14 in the form of a potentiometer 13, the center point being earthed. The potentiometer 13 and the tachometer-generator 12 are arranged in relation to each other and to the control system as a whole so that a certain direction of rotation of the motor corresponds to negative output voltage from the tachometer-generator and positive voltage from the potentiometer 13.

From the current reference emitter 15 a desired value is obtained for the direct current which corresponds to the difference between the desired value and the actual value of the speed. The desired value of the current is connected to a summation member 18 over one or two switching members 2, 3, and a polarity-reverser 4 is arranged in series with 3 so that the desired value during stationary conditions is always connected with the same polarity to 18. The switching members 2 and 3 are controlled by individual contacts in one of the pole shifters 10 or 11, respectively and have the character of electronic make-contact relays. A signal is also connected to the member 18 which corresponds to the actual value of the direct current and which can be obtained from a current meter, for example a measuring transductor 16 in a conductor between the converter and the pole shifting contacts.

The output from the member 18 is connected to a current regulator 7 of known type which delivers a control voltage $E_s$ corresponding to the desired converter voltage, see FIGS. 1 and 2.

The desired value of the current from 15 as well as the actual value from 16 are further connected to a control member 5 for the pole shifters 10 and 11. The armature voltage of the motor is taken out and connected through a voltage reduction circuit 17 (DC transformer, Hall-generator, voltage divider or the like) to a voltage adjuster 6. The control member 5, voltage adjuster 6 and current regulator 7 are shown more in detail in FIG. 4 and will be described in connection with the function of the system in FIG. 3.

When the motor is started in the forward direction, a certain positive voltage is set on the potentiometer 13. Since the motor is standing still, the tachometer-generator delivers no voltage so that the current reference emitter 15 is only influenced by the potentiometer voltage and emits a negative desired value which is connected to the control member 5 through the terminal IR and to the switching members 2 and 3 which are, however, blocked for the moment.

In the control member 5 the negative desired value, also designated IR, is supplied to a discriminator 501 which only emits an output signal when IR is positive. In this case, therefore, the output signal will be zero from 501 so that the signal inversing gate 506 gives an output signal over the switching member 504, the flip-flop device 505 moves to "zero" position and delivers an output signal which is supplied to the And-gate 510, directly as well as through the switching member 508 which is controlled by the signal switching gate 514.

This has for the moment no input signal and its output signal therefore keeps the member 508 open, the flip-flop 509 moves to "zero" position so that the And-gate 510 receives signals at both inputs and gives a starting signal to the forward relay 10 in FIG. 3, the contacts of which close. The signal from 510 will be supplied through the gates 515 and 512 and the member 513, as described later, to the signal inverter 514, the output signal of which then disappears and 508 is blocked. Nothing happens, however, since the flip-flops 505 and 509 are already in "zero" position.

When the forward relay 10 closes, the member 2 in FIG. 3 is opened, the current reference IR is supplied through the member 18 to the current regulator 7 which delivers positive control voltage $E_s$ to the converter 8 which delivers current to the motor 9 through the contacts in the forward direction and the motor starts in the forward direction and increases its speed until the signal from the tachometer-generator 12 agrees with that set on the potentiometer 13. In the same way the current in the converter and the motor increases and its value IS, measured by the transductor 16, is supplied to the members 18, 5 and at the desired speed the members 14, 15, 18 and 7 are balanced. The actual value of the converter current, as mentioned, is supplied to the member 5 through the terminal IS which leads to a discriminator 502 which, like 501, only gives an output signal for positive input values. The circuit is so constructed that the signal from the measuring transductor 16 can only be positive so that 502 delivers an output signal to 503, 504 and 512. 512 is an Or-gate which already has an input signal from 515. 503 and 504 are blocked by the input signal, which gives no alteration, however, since the flip-flop 505 is already in its zero position. The motor thus continues its operation undisturbed. The case corresponds to FIGS. 1a and 2a.

When the speed is retarded either to a lower speed or for reversal of the motor, the potentiometer 13 is set at a lower or negative value, respectively, so that the tachometer voltage will dominate in the member 14 and the desired value of the current, that is, the output from 15, changes sign and becomes positive. The discriminator 501 in FIG. 4 will then emit an output signal but since the members 503 and 504 are blocked, this has no immediate consequences.

Figure 1B:
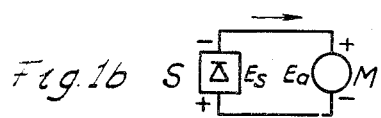
Figure 1C:
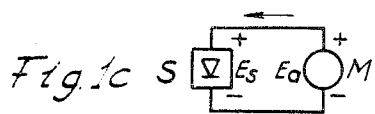
Figure 1D:
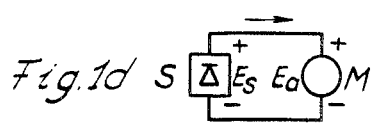

On the other hand, the altered polarity of IR will affect the members 2, 18 and 7 so that the control voltage $E_s$ to the converter 8 tends towards a negative value, and the converter is then retarded towards inverter operation corresponding to FIGS. 1b and 2b. The main current then decreases and IS thus rapidly becomes zero so that the output signal from the discriminator 502 disappears. The members 503 and 504 are then opened, the latter being without an input signal from 506. On the other hand, due to the signal from 503 the flip-flop 505 will move to 1-position so that the lower input signal to the gate 510 disappears and the forwards relay 10 is disconnected. The converter and motor are thus disconnected. The member 2 blocks so that the current reference IR to 18 disappears.

The gate 515 and thus gate 512 will now be without signals, and the input signal to the switch 514 thus also disappears. However, this does not take place immediately. A delay member 513 maintains the signal to 514 a moment so that the members 507 and 508 remain blocked. The disappearance of the output signal from 515 causes a switching member 75 at the input of the summation member 18 in FIG. 4 to become conducting, so that a positive voltage over a resistor 74 is supplied to the current regulator 7. This comprises an amplifier 71 with feedback capacitor 72 and the positive input voltage from 74 through 75 and 18 causes a negative output voltage from 71 and thus full retardation of the converter. This retardation, however, is limited corresponding to the maximum permitted control angle ($\alpha_2$ in FIG. 2c), that is, inverter operation with the help of a limit value emitter in the form of a potentiometer 73 fed from a positive voltage source and connected to 18 over a diode 78, a voltage divider 76, 77 and a switching member 65 controlled by the signal from 512. The signal $E_s$, therefore, cannot be more negative than the voltage from 73 determines.

As mentioned earlier, the armature voltage is taken out from the motor 9 and a reduced voltage $E_a$ is fed through the member 17 proportional to the armature voltage to the device 6. When the motor is running in the forward direction $E_a$ is regarded as positive. The flip-flop 505 is in 1-position and emits signals to the upper input of the And-gate 511 and to the switching member 61 so that the signal from 17 through 61 and a resistance combination 63a, b and 67 is supplied to the switching member 64 controlled from the gate 512. The signal from this gate 512 is zero so that 64 is open while 65 is closed. This means that the limit value emitter 73 is replaced by the voltage adjusting device 6 and the regulator 7 will receive an input voltage corresponding to the control angle $\alpha_3$ in FIG. 2c and a converter voltage which is less than the armature voltage of the motor only by a quantity which is determined by 63a, 63b and 67 and which substantially corresponds to the ripple in the direct voltage of the converter. This voltage is stored in the feedback capacitor 72 in the regulator 7.

When the delay member 513 then interrupts the input signal to 514, the member 507 is opened so that the flip-flop 509 moves to 1-position. The gate 511 thus receives a double input signal and switches the reverse relay 11 to its on-position. The current reference IR is then connected over the polarity-reverser 4 and member 3 to 18 and thus to the regulator 7. At the same time the gate 515 receives an input signal and delivers an output signal to 512 and 75. The retardation circuit 74, 75 is thus blocked and switching takes place from 6 to 73. The signal from 6, however, remains in the capacitor 72. The converter 8 will thus be connected to the motor in a control position with the control angle $\alpha_3$ according to FIGS. 1c and 2c. Since there is no switching on delay in 513, the signal from 515 through 512 and 513 causes the output signal from 514 to disappear so that 507 and 508 are blocked. The flip-flop 509 remains in its 1-position, however.

The current reference IR is positive but is reversed in the polarity-reverser 4 so that the converter tends towards a decreasing control angle. The direct current will thus very quickly become equal to the current set corresponding to IR, but the converter operates as an inverter and power is fed from the motor to the converter so that the motor is braked. The direct current then decreases and the regulator decreases the control angle and, when the motor is reversed, the process continues with substantially constant direct current but decreasing control angle. When this passes 90° the converter is transferred to rectifier operation, the motor is braked completely and alters its direction of rotation. It is then driven in reverse until the new reverse speed and thus balance in the control chain 14, 15, 4, 3, 18, 7, is achieved. When the current increases IS emits a signal through 502 so that 503 and 504 are blocked but the flip-flops 505 and 509 remain in 1-position.

If the speed is only to be reduced the process described above will be interrupted when the lower speed is passed. The signal then changes polarity in the chain 14, 15, 4, 3, 18, 7, and the converter is again retarded and the direct current and thus IS becomes zero.

When IR shifts polarity and becomes negative, the signal from 501 disappears and 506 emits a signal. When IS is zero 504 opens and the flip-flop 505 moves to zero position. The reverse relay 11 drops and member 3 is blocked. The signal from 515 and from 512 disappears. The retardation 74, 75 is connected and the limiting device 73 is replaced by the member 6 which, this time through the polarity-reverser 66 and switching member 62, sets a new signal in the regulator 7, corresponding to control angle $\alpha_4$ according to FIGS. 1d and 2d. After a while 513 interrupts the signal to 514 so that the zero signal from the flip-flop 505 is supplied to the gate 510 directly as well as over 508 and the flip-flop 509 which moves to zero position. 515 and 512 again emit signals so that the retardation 74, 75 disappears and 6 is replaced by 73. 507 and 508 are blocked.

The negative current reference IR is connected over the member 2 and gives positive control voltage $E_s$ from 7 with the output angle $\alpha_4$ and the converter, which has now once more been connected over the forward relay 10, is advanced until its direct current increases until IS is equal to IR and the speed is fixed at a tachometer voltage corresponding to that set on the potentiometer.

Whereas previously after a switching it was always necessary to start the converter with full retardation, that is, maximum control angle $\alpha_2$ dictated by the limit value emitter 73, according to the invention the converter is always started with a control angle $(\alpha_3, \alpha_4)$ corresponding to a converter voltage $E_s$ which is slightly below the motor voltage $E_q$ in question. The subsequent advance thus means that the converter becomes almost immediately current carrying and excellent continuity in the switching is obtained. Technically, therefore, it is the voltage adjusting device 6 which is novel according to the invention.

It is also seen that the magnitude of the gap which is avoided depends on the difference between the motor voltage $E_q$ and the voltage corresponding to full retardation of the inverter, in other words, the difference between the control angle $\alpha_3$ or $\alpha_4$ and the maximum control angle $\alpha_2$. The greatest time gain is obtained according to FIGS. 1d and 2d which is much more important since in this case there are two switchings.

In FIG. 3 the polarity shifter is shown as a contact switch. In systems where the demand for speed is such that the voltage adjuster described above is used, it is however preferred to replace the contact switch by a valve switch having reverse-parallel-connected thyristor valves, so that a more rapid switch-over is obtained. The relays 10 and 11 in FIG. 3 are then replaced by control devices for the thyristor valves. The principle is illustrated in FIG. 5 which shows the converter 8 and the motor 9 connected through two reverse-parallel-connected sets of thyristors 10a, b and 11a, b, controlled by the And-gates 510 and 511, respectively.

Figure 4:
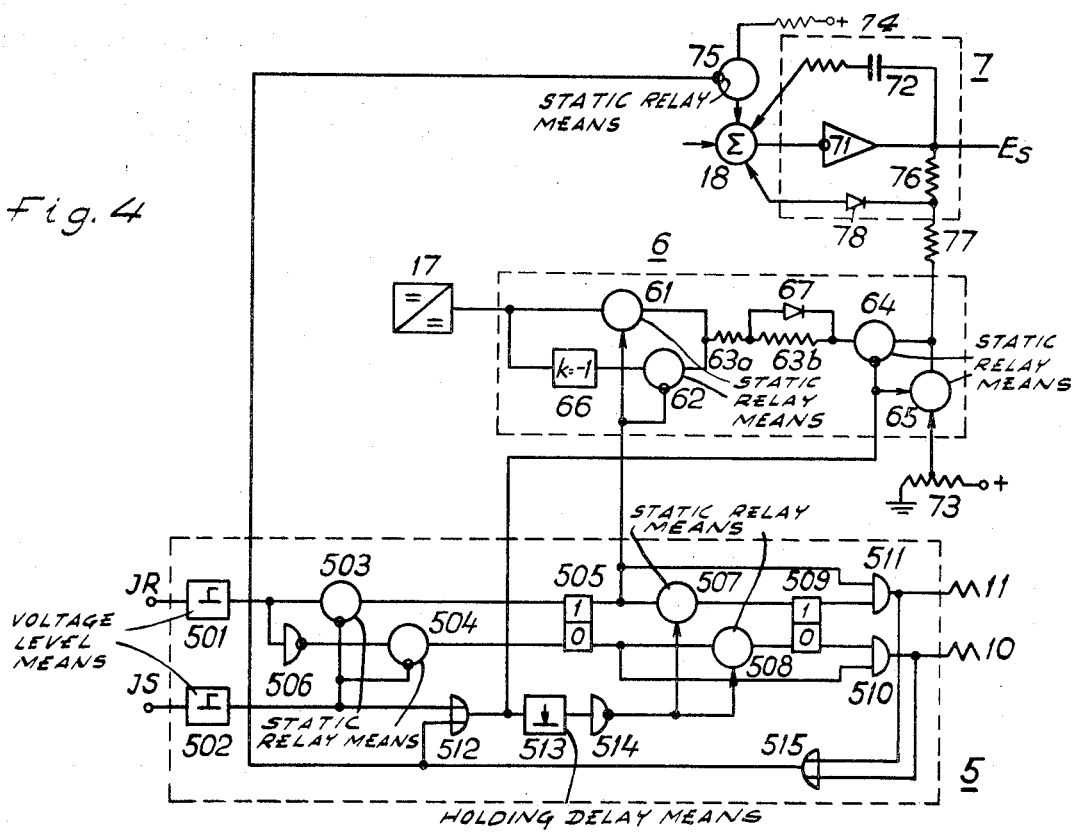
Figure 5:
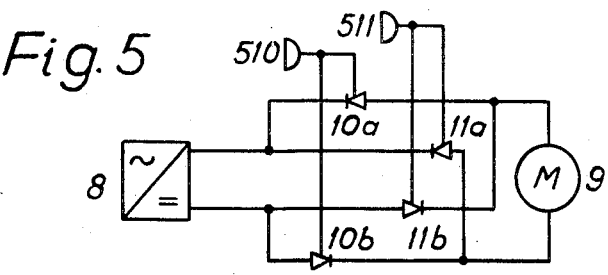

It should also be pointed out that the blocking of the converter 8 according to FIGS. 3, 4 and 5 is done by disconnecting the current reference IR over 2 or 3 and connecting the retarding signal from 74, 75.

Figure 6:
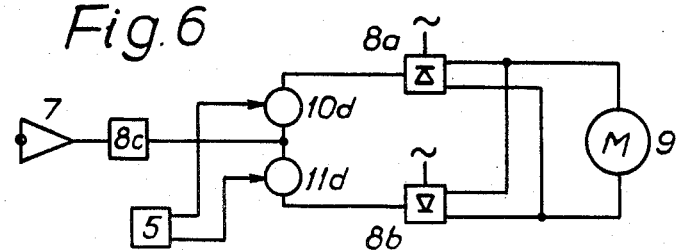

A system which in its function is equivalent to that in FIG. 5 is obtained if the converter 8 is replaced by two reverse-parallel-connected converters 8a and b, as shown in FIG. 6. These may be provided with a common control pulse generator 8c which is controlled by the current regulator 7. Connection and disconnection of the converter is then done by connecting and disconnecting the control pulses by means of the switching members 10d and 11d controlled by the control member 5 in the same way as the switches 10 and 11 in FIG. 3. In this case it is seen that upon a switching, one of the converters is blocked by disconnecting the pulse generator 8c, after which the other converter is deblocked when the control pulse generator is connected to it.

We claim:

1. In combination with an A.C. network and a D.C. load, a reversible converter arrangement comprising a rectifier and feeding the D.C. load from the A.C. network, a current regulator for said converter; means to supply to the input side of the current regulator a signal representing the difference between the actual value of the direct current of the converter and a desired DC value in the converter; said current regulator including means responsive to the input signal to produce a predetermined direct voltage in the rectifier output, and means for switching the polarity of the converter depending on the polarity of the desired value of the current; said means on the input side of the current regulator including means responsive to a shifting of the polarity of said desired D.C. value to retard the converter towards inverter operation before shifting of the polarity of the converter and consequent unblocking and advancing towards rectifier operation, the improvement in which the converter comprises voltage limiting means for said converter, said voltage limiting means including means operatively connected to said polarity shifting responsive means and responsive to a shifting of the polarity of said desired D.C. value, said voltage limiting means comprising a member to sense the voltage over said D.C. load, said voltage limiting means including means to limit the voltage of the converter to a value which is a little less than the voltage over said D.C. load.

2. Combination according to claim 1, in which said amount is less than, but substantially equal to, the amplitude of the D.C. ripple of the converter.

3. Combination according to claim 1, wherein said converter arrangement comprises two reverse-parallel-connected converters, a common control pulse device, separate members connecting the control pulse device to the rectifiers of the converters, and means responsive to the polarity of the desired value of the current to block said connecting members alternatively.

4. Combination according to claim 1, in which the converter arrangement comprises a blocking device connected to the input side of the current regulator and influenced by the real value and the desired value of the current, and including means responsive to an alteration in polarity of the desired value to cause first a retarding of the converter towards inverter operation, and, when the real value has fallen to a certain low value, blocking of the converter with consequent shifting of polarity and unblocking thereof.

5. Combination according to claim 4, wherein said converter arrangement comprises two reverse-parallel-connected converters, said blocking device, depending on the polarity of the desired value, blocking one or the other of said converters.

* * * * *